J. A. CYPERT.
HEAT SHIELD FOR AUTOMOBILES.
APPLICATION FILED MAR. 21, 1917.
1,258,990.
Patented Mar. 12, 1918.
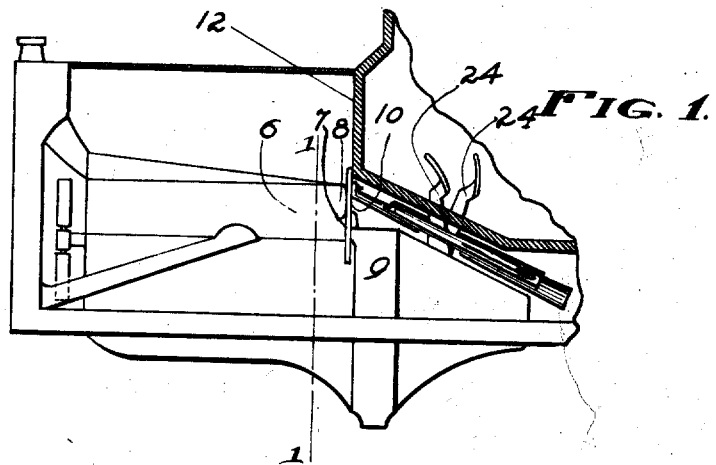
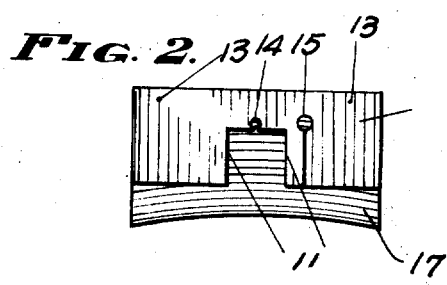
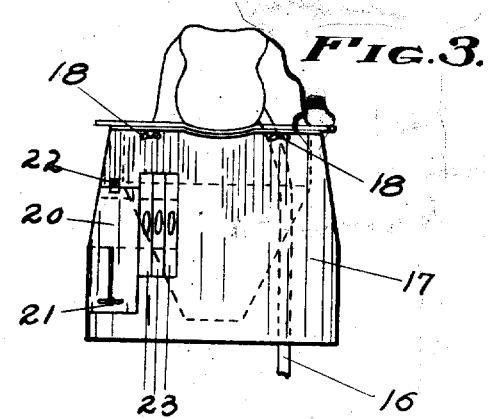
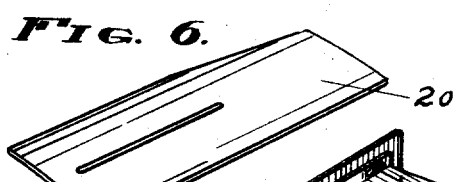
Inventor
Joseph A. Cypert.
By W. F. Davidson
Attorney

UNITED STATES PATENT OFFICE.

JOSEPH A. CYPERT, OF KANSAS CITY, MISSOURI.

HEAT-SHIELD FOR AUTOMOBILES.

1,258,990.  Specification of Letters Patent.  Patented Mar. 12, 1918.

Application filed March 21, 1917. Serial No. 156,496.

*To all whom it may concern:*

Be it known that I, JOSEPH A. CYPERT, a citizen of the United States, residing at Kansas City, in the county of Jackson and State of Missouri, have invented certain new and useful Improvements in Heat-Shields for Automobiles, of which the following is a full, clear, and exact description, such as will enable others skilled in the art to which it appertains to make and use the same.

The invention relates to heat shields for automobile bodies and seeks to entirely insulate the floor of the body from the heat generated by the engine and at the same time allow the necessary air circulation below the body of the car to carry off the heat generated by the engine.

The floor of an automobile is usually provided with openings for the operating levers, and owing to the forward motion of the machine and the upward tendency of hot air, the heat passes under the floor heating it to a disagreeable temperature and issues through the floor around the operating levers to the extent that the feet of the operator are very frequently burned.

There have been attempts to overcome the objections of the disagreeably heated floor by arranging a shield to direct the air downward below the frame of the automobile, but this method is objectionable for the reason that it obstructs the air passage which is a vital necessity to the cooling system of the radiator. This construction is believed to have resulted from the difficulty of passing the operating levers of the automobile without exposing openings for the rising heated air, thereby defeating the purpose for which it was intended.

An object of the improved invention is to provide a shield that will extend rearwardly between the floor of the body and the transmission of the engine, and beyond the end of the transmission case, allowing a circulation of air below the shield to carry off all heated air from the engine and cool the radiator.

Another object of the improved invention is to completely seal the opening in the shield for the operating levers preventing heated air from rising therearound and arranged to allow the full control of the operating levers.

Another object of the invention is to provide an improved heat shield that can be attached to the ordinary automobile, preferably a Ford car, and arranged whereby it may be slid into position around the operating levers, and slides arranged to snugly fit the levers to prevent air rising between the shield and the levers.

Another object of this invention is to provide a means to snugly fit a slide around a lever having larger ends than the portion of the lever to receive the slide.

With these and other objects in view the invention consists in the features of construction, combinations and arrangements of parts hereinafter set forth and more particularly pointed out in the appended claims, the accompanying drawings illustrating an application of the invention.

In the drawings:—

Figure 1 is a fragmentary broken view of an automobile illustrating the improved heat shield in position.

Fig. 2 is a front view of the shield as viewed from line 1—1 of Fig. 1.

Fig. 3 is a plan view of the shield showing the slides in position and a fragmentary view of the automobile engine, transmission and the exhaust pipe shown in dotted lines.

Fig. 4 is a perspective view of the heat shield with the slides removed to show the slot cut therein to allow the full operation of the levers.

Fig. 5 is an enlarged perspective view of one of the lever slides illustrating the manner of spreading the portions of the slit side preparatory for the reception of the lever.

Fig. 6 is an enlarged perspective view of the slide adapted to close the opening in the shield after being placed around the levers.

The engine frame 6 of the Ford motor car is constructed in such a manner as to leave the narrow upward projection 7, between the cylinder 8 and fly wheel casing 9. The vertical shield 10 is provided with a slot 11 adapted to fit over the projection, securing the shield to the engine and allowing the upper portion of the shield to spring against the body of the car 12, making a tight fit and forcing the air currents to detour below the bottom of the vertical shield. It is not necessary to secure the upper portion of the vertical shield to the body of the car but if so desired it may be secured by nails or screws driven through holes 13.

The vertical shield 10 is provided with hole 14 and a slit leading thereto from the edge of the shield for the reception of the ordinary and well known ignition wires extending from the dash board to the engine of an automobile.

The vertical shield 10 is provided with hole 15 and a slit leading thereto from the edge of the shield for the reception of the ordinary exhaust pipe 16.

Slanting shield 17 is entirely supported by one end thereof secured to the vertical shield by bolts 18, this being the most convenient and practical way for forming an air space therebelow, making a very efficient heat insulating shield.

Shield 17 is provided with a wide slot 19 opening out at one edge of the shield and arranged to easily slide around the levers of the automobile without disturbing any parts thereof. This slot is wide enough to allow the full shifting of the operating levers.

After the shield 17 is positioned on the automobile the closing slide 20 is slid into closed position as shown in Fig. 3 and secured in place by bolt 21 and catch 22 thus closing all the opening unnecessary for the operation of the levers.

The lever slides 23 are preferably of thin fiber or other pliable material, each provided with an opening to fit snugly around the respective operating lever 24 and a slit 25 extending from the outer side of each slide to the opening in the center thereof for the easy admittance of the levers. The slides are arranged to fit tightly together and are of sufficient length to maintain an absolute closure from air passing between the shield 17 and levers 24 regardless of the position of the levers.

In the operation of the device the parts are assembled as described and shown in the accompanying drawing, the vertical shield adapted to force the air downward for a short distance so that it may be allowed to easily follow the surface of the shield 17 with the least possible heating thereof, and the shield 17 of sufficient length to allow the air to be conveyed rearwardly far enough to prevent the return of air into the air space above the shield 17.

This arrangement provides an absolute heat insulator and at the same time does not interfere with the air circulation necessary for the radiator cooling system.

Having described my invention, what I claim as new, and desire to secure by Letters Patent, is:—

1. A shield adapted to be secured to the frame of an engine mounted upon an automobile, a second shield supported by said first shield, and between the transmission case and the floor of the car whereby air may pass from the radiator of the car between the shields and the transmission case of said automobile.

2. A shield adapted to fit and fill between the side walls of the body of a car and below the floor, said shield spaced above the transmission case and between the transmission case and the floor and extending rearwardly beyond the transmission case, and said shield arranged to fit snugly around the operating levers of said car to prevent air from passing between said levers and said shield.

3. A shield adapted to be supported and spaced between the floor and transmission of an automobile, a slot in said shield arranged to receive the operating levers of said automobile, slides, said slides having slots and slits therein to fit around said levers and slide on said shield whereby air cannot circulate between said levers and said shield.

4. A shield provided with a slot adapted to be slid between the floor and transmission of an automobile and spaced therebetween, said slot arranged to allow the operation of the operating levers on said automobile, and slides arranged to prevent air under the shield from rising thereabove.

5. A shield provided with a slot, said shield arranged to be slid around and beyond the operating levers of an automobile so that said slot will receive said levers, slides slipped on said levers and adapted to slide on said shield, and a slide arranged to close the portion of slot in the portion of said shield extending beyond the operating levers.

JOSEPH A. CYPERT.